(12) United States Patent
Chan et al.

(10) Patent No.: US 11,567,599 B1
(45) Date of Patent: Jan. 31, 2023

(54) TOUCH PANEL AND MANUFACTURING METHOD THEREOF

(71) Applicant: Primax Electronics Ltd., Taipei (TW)

(72) Inventors: Wei-Ping Chan, Taipei (TW); Wei-Chiang Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/508,732

(22) Filed: Oct. 22, 2021

(30) Foreign Application Priority Data

Aug. 16, 2021 (TW) .................................. 110130183

(51) Int. Cl.
*B32B 37/00* (2006.01)
*B32B 37/12* (2006.01)
*G06F 3/041* (2006.01)

(52) U.S. Cl.
CPC ........ *G06F 3/0412* (2013.01); *B32B 37/0046* (2013.01); *B32B 37/12* (2013.01); *B32B 2037/1253* (2013.01); *B32B 2457/208* (2013.01); *G06F 2203/04103* (2013.01)

(58) Field of Classification Search
None
See application file for complete search history.

(56) References Cited

U.S. PATENT DOCUMENTS

| 10,353,520 | B2 * | 7/2019 | Takakusagi | ............... B32B 7/12 |
| 10,414,133 | B2 * | 9/2019 | Hino | ...................... B32B 27/365 |
| 11,404,663 | B2 * | 8/2022 | Wang | ..................... H01L 51/56 |

* cited by examiner

*Primary Examiner* — Duane N Taylor, Jr.
(74) *Attorney, Agent, or Firm* — Kirton McConkie; Evan R. Witt

(57) ABSTRACT

A touch panel and a manufacturing method of the touch panel are provided. The touch panel includes a touch circuit board, a cover plate and a glue layer. The glue layer is arranged between the touch circuit board and the cover plate to bond the touch circuit board and the cover plate. The glue layer contains an epoxy resin main agent and an epoxy resin hardener.

10 Claims, 3 Drawing Sheets

TOUCH PANEL AND MANUFACTURING METHOD THEREOF

FIELD OF THE INVENTION

The present invention relates to an input module, and more particularly to a touch panel for an electronic device.

BACKGROUND OF THE INVENTION

A touch panel is an input module that allows a finger to press or slide on a smooth panel to control the operation of an electronic device. Since touch panels are very light and thin, touch panels are often used in notebook computers, mobile phones, personal digital assistants (PDAs) or other portable electronic devices.

In the existing bonding technologies for the touch panel, a pressure sensitive adhesive (PSA) or a thermosetting double-sided adhesive is used to bond a cover plate and a touch circuit board of the touch panel.

The touch panels using the pressure sensitive adhesive are divided into a non-substrate type and a composite-substrate type. The non-substrate type touch panel only uses the pressure sensitive adhesive to achieve the bonding function. Consequently, the overall thickness of the touch panel is thinner. However, since the pressure sensitive adhesive lacks hardness, the physical strength of the touch panel to withstand the long-term pressing action of the finger is insufficient. The composite-substrate type touch panel uses the pressure sensitive adhesive to bond a multilayered substrate structure. Consequently, the physical strength of the touch panel is increased. However, due to the multilayered substrate structure, the manufacturing process becomes complicated, and the touch panel becomes thicker. In other words, the composite-substrate type touch panel is unable to meet the slimness requirements of the modern electronic devices.

The use of the thermosetting double-sided adhesive to bond the cover plate and the touch circuit board of the touch panel can produce the good physical strength. However, the manufacturing process is more complicated. In addition, the thermosetting double-sided adhesive needs to be stored at low temperature when it is not in use. In other words, it is difficult for manufacturers to instantly control the raw material supply chain on the production line. Consequently, the efficiency of the production line operation is impaired.

For overcoming the drawbacks of the conventional technologies, there is a need of providing an improved touch panel. The raw material is easily stored, the manufacturing process is simplified. In addition, the touch panel is light and thin, and has high physical strength.

SUMMARY OF THE INVENTION

The present invention provides a touch panel. The raw material is easily stored, the manufacturing process is simplified. In addition, the touch panel is light and thin, and has high physical strength.

In accordance with an aspect of the present invention, a manufacturing method of a touch panel is provided. The manufacturing method includes the following steps. In a step (a), a cover plate and a touch circuit board are provided. In a step (b), a glue layer is formed between the cover plate and the touch circuit board. The glue layer contains an epoxy resin main agent and an epoxy resin hardener. In a step (c), the glue layer is cured, so that the cover plate and the touch circuit board are bonded together.

Preferably, in the step (b), a weight ratio of the epoxy resin main agent to the epoxy resin hardener is 1:3.

Preferably, in the step (b), a viscosity of the glue layer in a range between 11000 centipoise (cps) and 15000 cps.

Preferably, in the step (b), a downward force and an upward force are respectively applied to the cover plate and the touch circuit board to laminate the cover plate, the glue layer and the touch circuit board.

Preferably, in the step (c), the glue layer is baked at temperature of 78 degrees Celsius (° C.) to 82° C. for 15 minutes to 23 minutes.

In an embodiment, after the step (c) is completed, a thickness of the glue layer is 0.2 millimeter (mm).

In accordance with another aspect of the present invention, a touch panel is provided. The touch panel includes a touch circuit board, a cover plate and a glue layer. The glue layer is arranged between the touch circuit board and the cover plate. The touch circuit board and the cover plate are bonded together through the glue layer. The glue layer contains an epoxy resin main agent and an epoxy resin hardener.

In an embodiment, a weight ratio of the epoxy resin main agent to the epoxy resin hardener is 1:3.

In an embodiment, a thickness of the glue layer is 0.2 mm.

In an embodiment, a thickness of the cover plate is in a range between 0.7 mm and 1.1 mm.

In an embodiment, a thickness of the touch circuit board is in a range between 0.4 mm and 0.6 mm.

In an embodiment, a deformation amount of the touch panel is in a range between 0 mm and 0.38 mm.

From the above descriptions, the touch panel of the present invention is advantageous over the conventional technology. In the touch panel, the glue layer for bonding the cover plate and the touch circuit board contains the epoxy resin main agent and the epoxy resin hardener. Consequently, the equipment requirement condition is not very stringent. In comparison with the thermosetting double-sided adhesive used in the conventional touch panel, the storage of the epoxy resin agent is easier, and the material quality of the epoxy resin agent is more stable. Consequently, the manufacturers can instantly and simply control the raw material supply chain on the production line, and the efficiency of the production line operation can be enhanced. Moreover, the price of the raw materials of the epoxy resin agent is one-tenth of the price of the thermosetting double-sided adhesive. Consequently, the production cost of the product is effectively reduced.

In comparison with the touch panel using the pressure sensitive adhesive, the overall thickness of the touch panel of the present invention is in the range between 1.3 mm and 1.9 mm. Even if the volume of the touch panel is light and slim, the touch panel can maintain the satisfactory deformation amount and meet the demand for the high physical strength.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
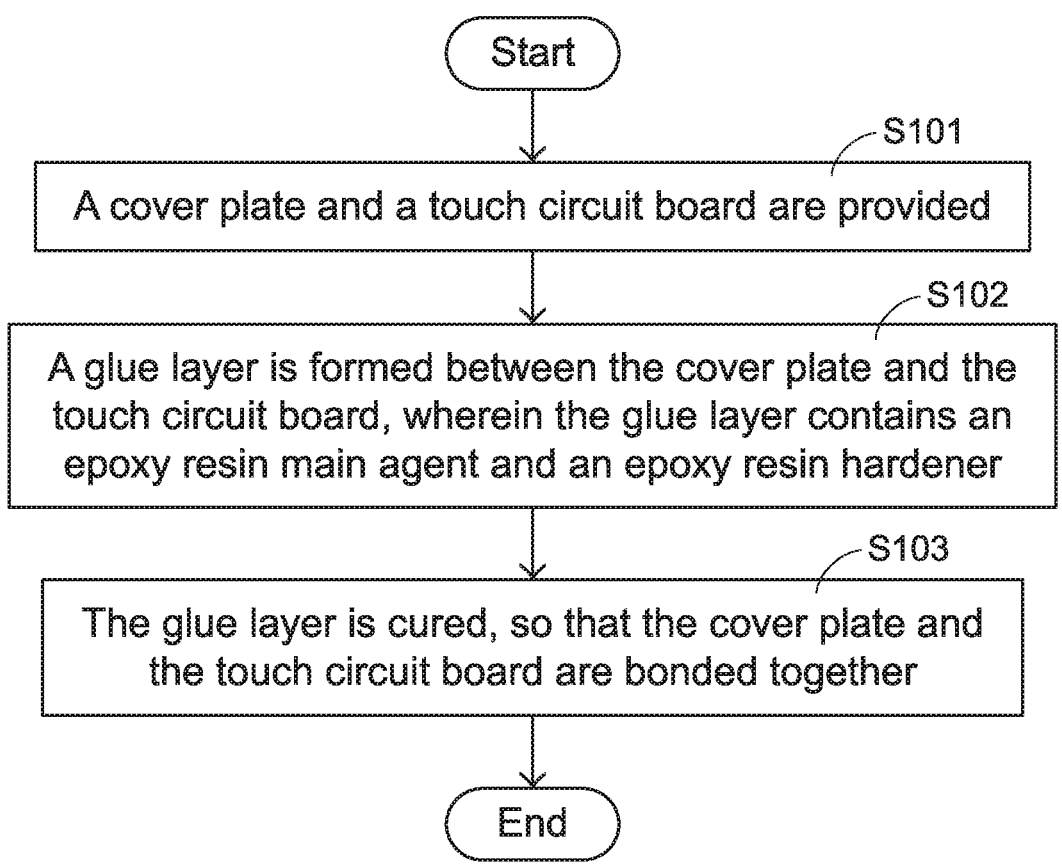
FIG. 1 is a flowchart illustrating a manufacturing method of a touch panel according to an embodiment of the present invention.
Figure 2:
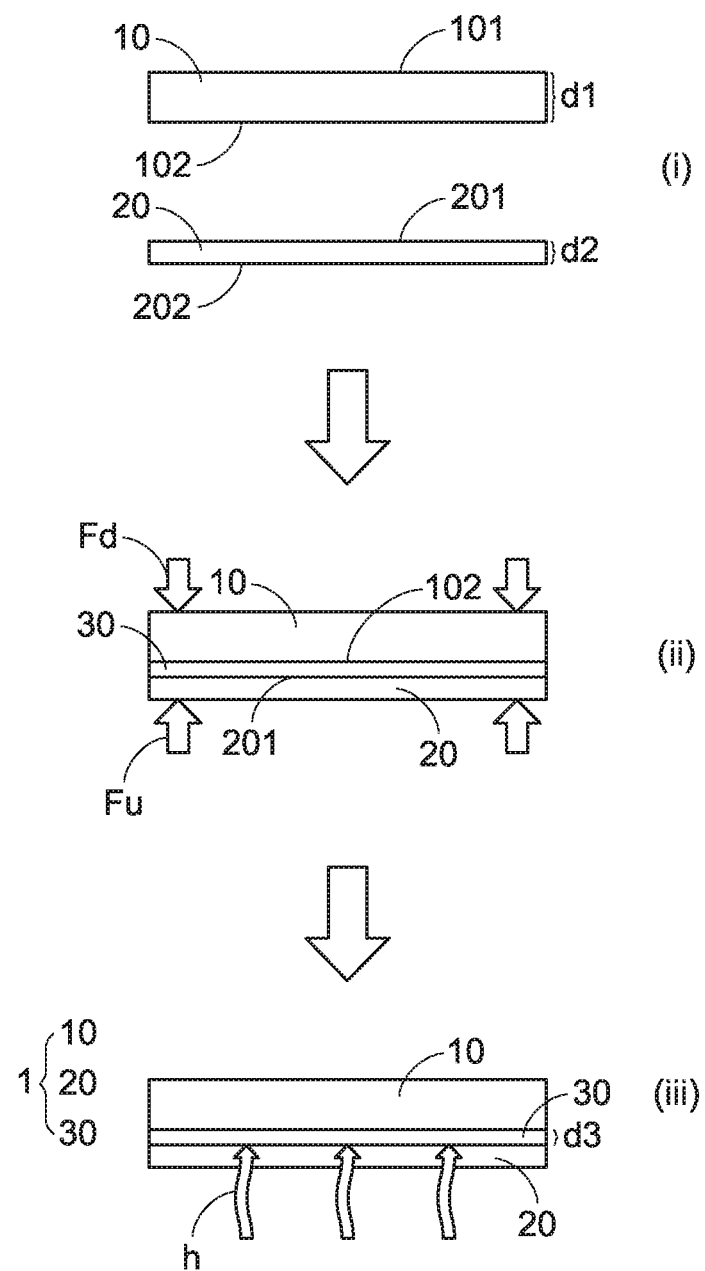
FIG. 2 is a schematic cross-sectional view illustrating the steps of the manufacturing method of the touch panel according to the embodiment of the present invention.

Please refer to FIGS. 1 and 2. FIG. 1 is a flowchart illustrating a manufacturing method of a touch panel according to an embodiment of the present invention. FIG. 2 is a schematic cross-sectional view illustrating the steps of the manufacturing method of the touch panel according to the embodiment of the present invention.

Firstly, a cover plate 10 and a touch circuit board 20 are provided (Step S101). In the step S101 and as shown in FIG. 2(i), the cover plate 10 has a top surface 101 and a bottom surface 102, and the touch circuit board 20 has a top surface 201 and a bottom surface 202. In an embodiment, the thickness d1 of the cover plate 10 is in the range between 0.7 mm and 1.1 mm, and the thickness d2 of the touch circuit board 20 is in the range between 0.4 mm and 0.6 mm. For example, the cover plate 10 is an ordinary glass plate or a sapphire glass plate.

Then, a glue layer 30 is formed between the cover plate 10 and the touch circuit board 20, wherein the glue layer 30 contains an epoxy resin main agent and an epoxy resin hardener (Step S102). In the step S102, the epoxy resin main agent and the epoxy resin hardener in a weight ratio of 1:3 are mixed, and the mixture is maintained at a viscosity between 11000 cps and 15000 cps. After the epoxy resin main agent and the epoxy resin hardener are mixed evenly, a dispensing device (not shown) is used to uniformly coat the mixture of the epoxy resin main agent and the epoxy resin hardener on the bottom surface 102 of the cover plate 10 or the top surface 201 of the touch circuit board 20. Meanwhile, the glue layer 30 in an uncured state is formed on the bottom surface 102 of the cover plate 10 or the top surface 201 of the touch circuit board 20. Then, as shown in FIG. 2(ii), a downward force Fd corresponding to the pressure of 5 bars to 7 bars and an upward force Fu corresponding to the pressure of 5 bars to 7 bars are respectively applied to the cover plate 10 and the touch circuit board 20 in order to laminate the cover plate 10, the glue layer 30 and the touch circuit board 20.

Afterwards, the glue layer 30 is cured, so that the cover plate 10 and the touch circuit board 20 are bonded together (Step S103). In the step S103 and as shown in FIG. 2(iii), the heat energy h from the dispensing device (not shown) is used to bake the glue layer 30 at the temperature of 78° C. to 82° C. for 15 minutes to 23 minutes. Consequently, the glue layer 30 is cured, and the touch panel 1 is manufactured. In an embodiment, the thickness d3 of the glue layer 30 is 0.2 mm after the glue layer 30 is cured.

The touch panel 1 of the present invention is light and thin. Consequently, the touch panel 1 is suitably installed on a desktop computer, a notebook computer, a tablet computer, a printer, a business machine, a game console, a keyboard, a mouse, a screen, an electronic door lock or any other appropriate electronic device.

Figure 3:
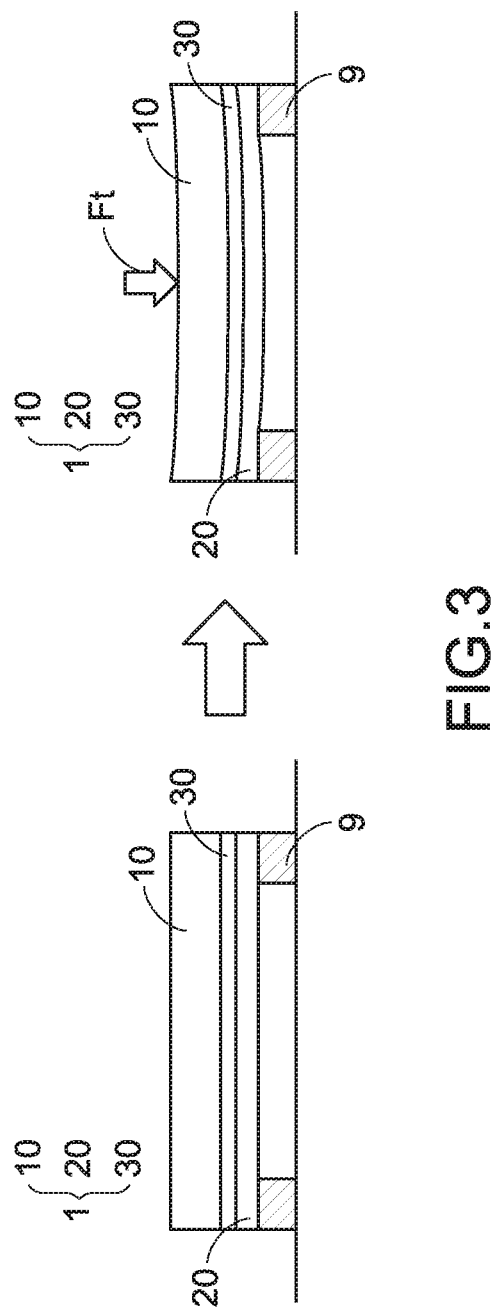
FIG. 3 is a schematic cross-sectional view illustrating the structure of the touch panel according to the embodiment of the present invention, in which the touch panel is subjected to a strength test.

Please refer to FIG. 3. FIG. 3 is a schematic cross-sectional view illustrating the structure of the touch panel according to the embodiment of the present invention, in which the touch panel is subjected to a strength test. As shown in FIG. 3, the touch panel 1 is firstly placed on a carrying platform 9. Then, a point test force Ft corresponding to the pressure of 2 $kgf/mm^2$ is applied to the touch panel 1. The test result shows that the deformation amount of the touch panel 1 is in the range between 0 mm and 0.38 mm. In other words, even if the overall thickness of the touch panel 1 is reduced, the physical strength of the touch panel 1 is high enough.

From the above descriptions, the present invention provides the touch panel. The glue layer for bonding the cover plate and the touch circuit board contains the epoxy resin main agent and the epoxy resin hardener. Consequently, the equipment requirement condition is not very stringent. In comparison with the thermosetting double-sided adhesive used in the conventional touch panel, the storage of the epoxy resin agent is easier, and the material quality of the epoxy resin agent is more stable. Consequently, the manufacturers can instantly and simply control the raw material supply chain on the production line, and the efficiency of the production line operation can be enhanced. Moreover, the price of the raw materials of the epoxy resin agent is one-tenth of the price of the thermosetting double-sided adhesive. Consequently, the production cost of the product is effectively reduced.

Moreover, in comparison with the touch panel using the pressure sensitive adhesive, the overall thickness of the touch panel of the present invention is in the range between 1.3 mm and 1.9 mm. Even if the volume of the touch panel is light and slim, the touch panel can maintain the satisfactory deformation amount and meet the demand for the high physical strength. Consequently, the touch panel of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A manufacturing method of a touch panel, the manufacturing method comprising steps:
   (a) providing a cover plate and a touch circuit board;
   (b) forming a glue layer between the cover plate and the touch circuit board, wherein the glue layer contains an epoxy resin main agent and an epoxy resin hardener, wherein a downward force and an upward force are respectively applied to the cover plate and the touch circuit board to laminate the cover plate, the glue layer and the touch circuit board; and
   (c) curing the glue layer, so that the cover plate and the touch circuit board are bonded together.

2. The manufacturing method according to claim 1, wherein in the step (b), a weight ratio of the epoxy resin main agent to the epoxy resin hardener is 1:3.

3. The manufacturing method according to claim 1, wherein in the step (b), a viscosity of the glue layer in a range between 11000 centipoise (cps) and 15000 cps.

4. The manufacturing method according to claim 1, wherein in the step (c), the glue layer is baked at temperature of 78 degrees Celsius (° C.) to 82° C. for 15 minutes to 23 minutes.

5. The manufacturing method according to claim 1, wherein after the step (c) is completed, a thickness of the glue layer is 0.2 millimeter.

6. A touch panel, comprising:
- a touch circuit board;
- a cover plate; and
- a glue layer arranged between the touch circuit board and the cover plate, wherein the touch circuit board and the cover plate are bonded together through the glue layer, wherein the glue layer contains an epoxy resin main agent and an epoxy resin hardener, wherein a weight ratio of the epoxy resin main agent to the epoxy resin hardener is 1:3.

7. The touch panel according to claim 6, wherein a thickness of the glue layer is 0.2 millimeter.

8. The touch panel according to claim 6, wherein a thickness of the cover plate is in a range between 0.7 millimeter and 1.1 millimeter.

9. The touch panel according to claim 6, wherein a thickness of the touch circuit board is in a range between 0.4 millimeter and 0.6 millimeter.

10. The touch panel according to claim 6, wherein a deformation amount of the touch panel is in a range between 0 millimeter and 0.38 millimeter.

\* \* \* \* \*